Sept. 28, 1943.　　　　G. SCHMIDT　　　　2,330,629
MACHINE FOR THE AUTOMATIC PRODUCTION OF WIRE-TYINGS FOR PACKETS
Filed June 5, 1939　　　7 Sheets-Sheet 2
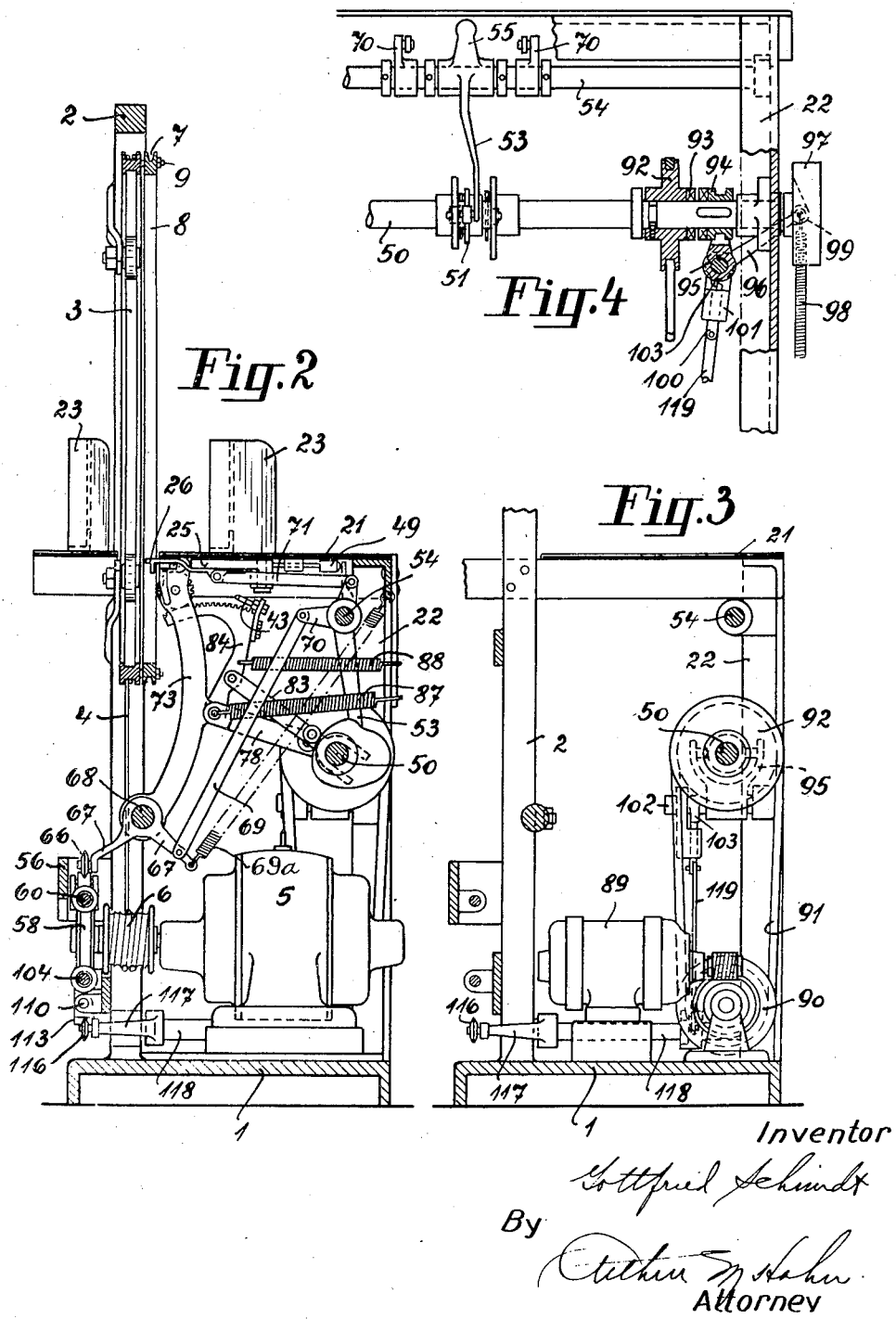
Inventor
Gottfried Schmidt
By
Arthur M Hahn
Attorney

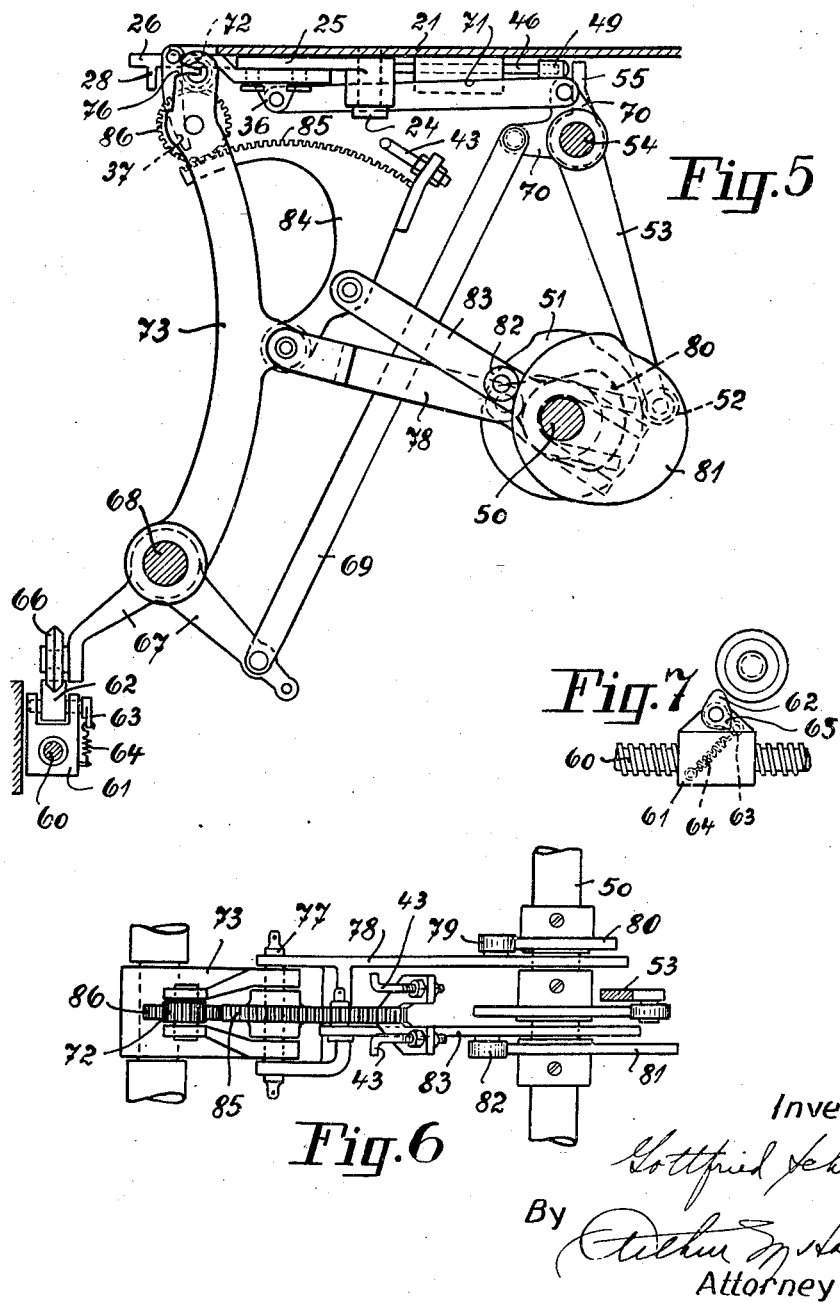

Sept. 28, 1943.  G. SCHMIDT  2,330,629
MACHINE FOR THE AUTOMATIC PRODUCTION OF WIRE-TYINGS FOR PACKETS
Filed June 5, 1939   7 Sheets-Sheet 4
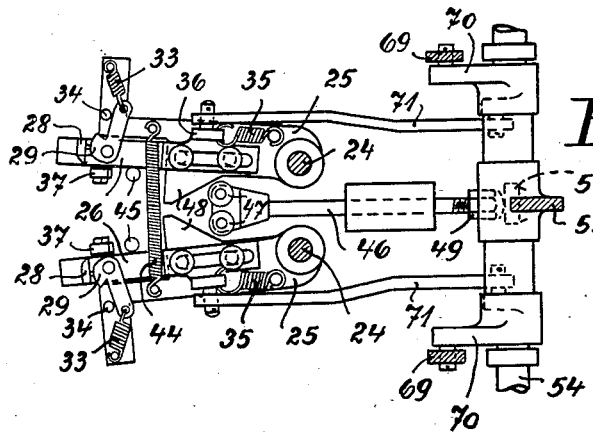
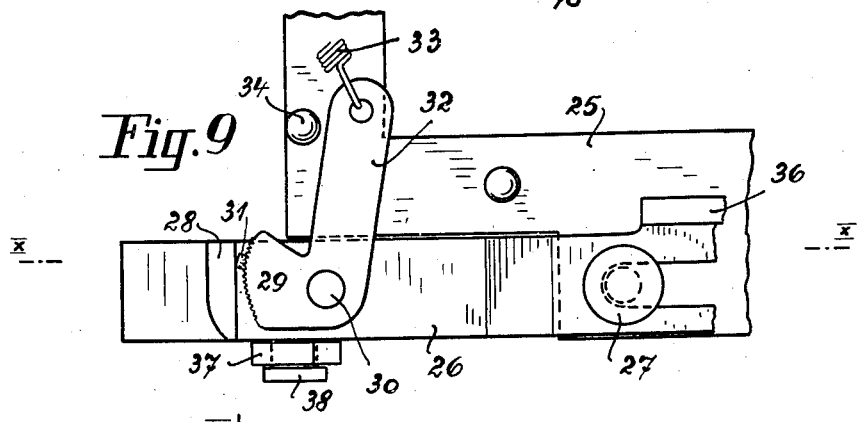
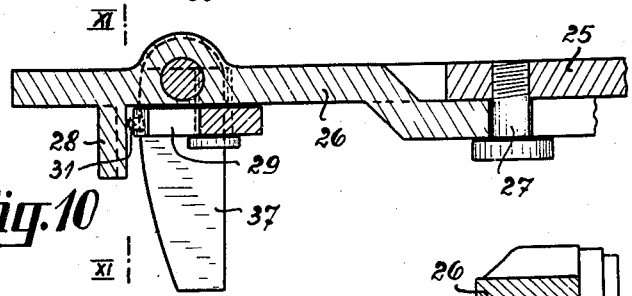
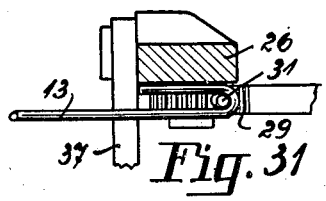
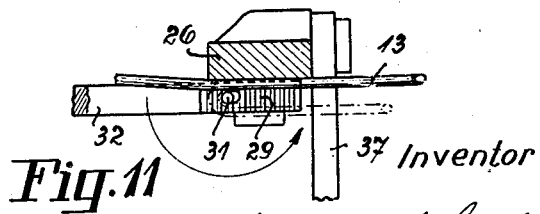

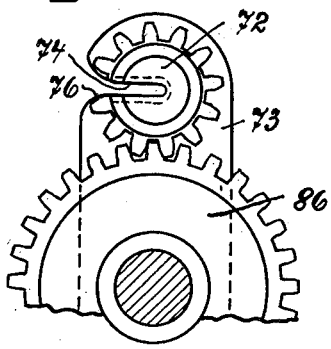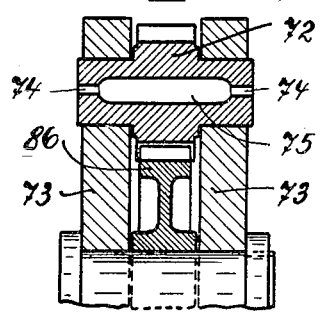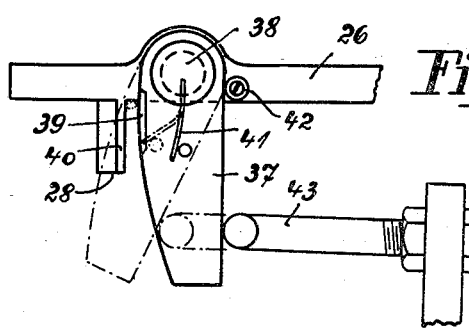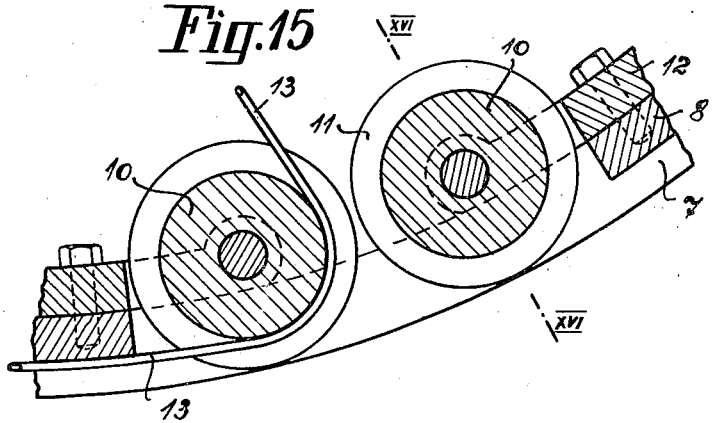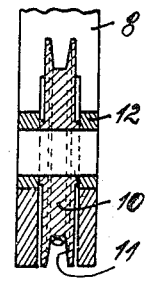

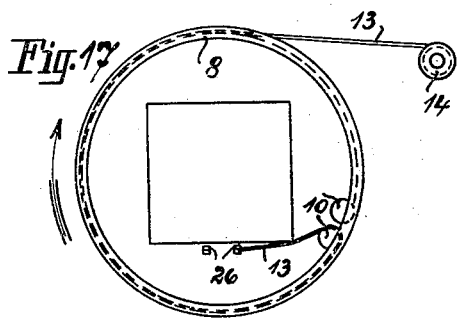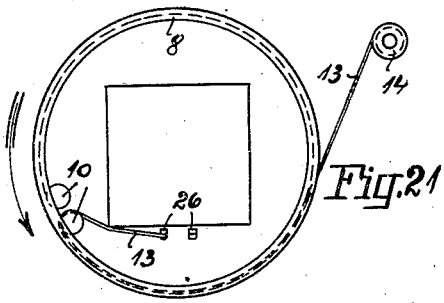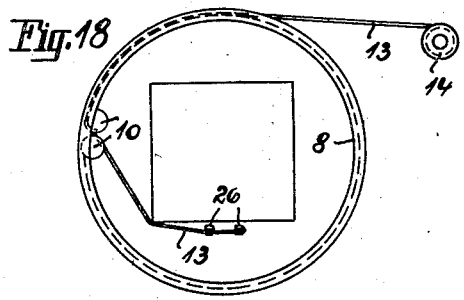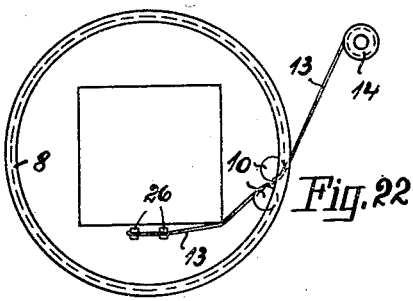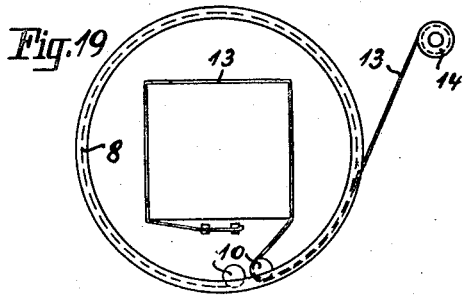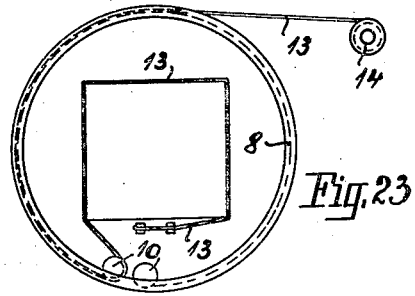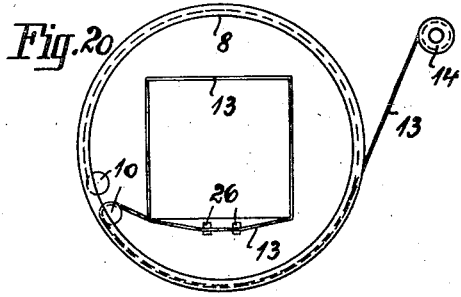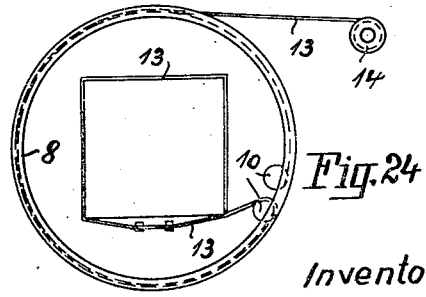

Sept. 28, 1943. G. SCHMIDT 2,330,629
MACHINE FOR THE AUTOMATIC PRODUCTION OF WIRE-TYINGS FOR PACKETS
Filed June 5, 1939 7 Sheets-Sheet 7
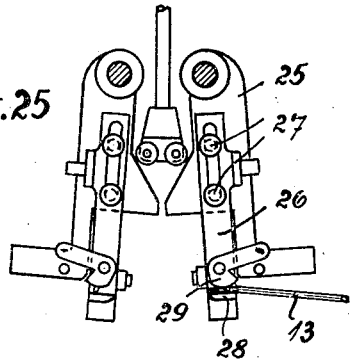
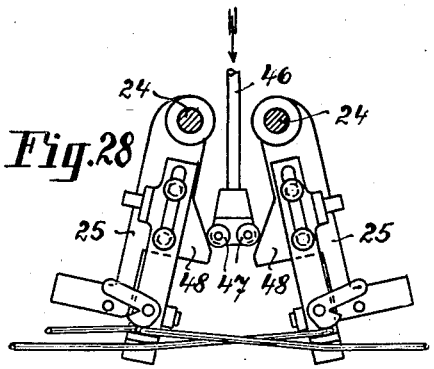
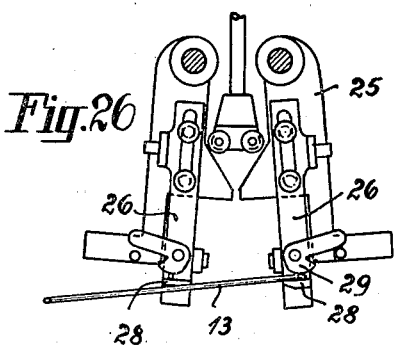
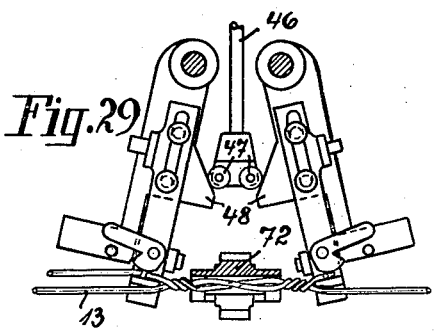
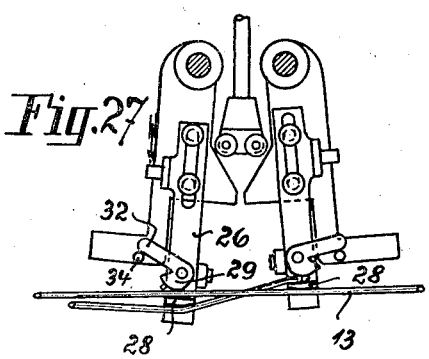
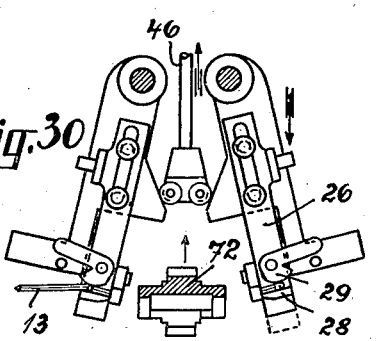
Inventor
Gottfried Schmidt
By Arthur M Hahn
Attorney Patented Sept. 28, 1943

2,330,629

UNITED STATES PATENT OFFICE 2,330,629

MACHINE FOR THE AUTOMATIC PRODUCTION OF WIRE TYINGS FOR PACKETS

Gottfried Schmidt, Cologne, Germany; vested in the Alien Property Custodian

Application June 5, 1939, Serial No. 277,561
In Germany April 6, 1939

17 Claims. (Cl. 100—31)

The present invention relates to an entirely automatic machine for winding, tightening and twisting a wire around objects.

The invention relates to such machines for the automatic production of wire-tyings for packets, boxes, etc., having a twisted connection in the longitudinal direction of the wire and in which the winding of the wire around the stationary packet is effected by a winding ring rotatable in a plane, in the inner space of which the packet is placed for the purpose of being provided with a tie. Specifically the invention relates to such machines of this kind in which the rotation of the winding-ring and the winding of the wire around the packet obtained thereby is effected alternately in a different direction for enabling the overlapping of the two ends of each tying or twist of the wire necessary for the production of the twisted connection without cutting off or severing the wire running from a spool or coil to the torsion-place from the clamping device holding it during the torsion.

In a machine of this kind hitherto known the tightening of this wire necessary for pressing the same closely to the surface of the packet is determined exclusively by the resistance of traction with which the wire is fed from the spool to that place at which it runs off from the winding-ring towards the packet. The value of the tightening of the tying obtainable thereby is very limited on account of the increase of the working resistance of the machine resulting from the unavoidable raising of this value which is generally insufficient in practice.

For removing this deficiency in the tying-machine according to the invention the two clamping devices by which the two ends of the tying wire are held fast during their torsion are arranged movably in the longitudinal direction of the wire and connected with means by which they are moved forcibly from each other by the motive force of the machine after the attachment of a wire tying under tension has been finished. By this means not only any high value of the circumferential tension of the tying may be obtained, but also a considerably higher capacity of resistance of its twisted connection, because the turns of the tying place are pressed together with a higher frictional pressure under the action of the higher circumferential tension.

In the drawings an example of the machine according to the invention is shown.

Fig. 2 is a longitudinal section taken on line II—II of Fig. 1,

Fig. 3 is a longitudinal section taken on line III—III of Fig. 1,

Figure 1:
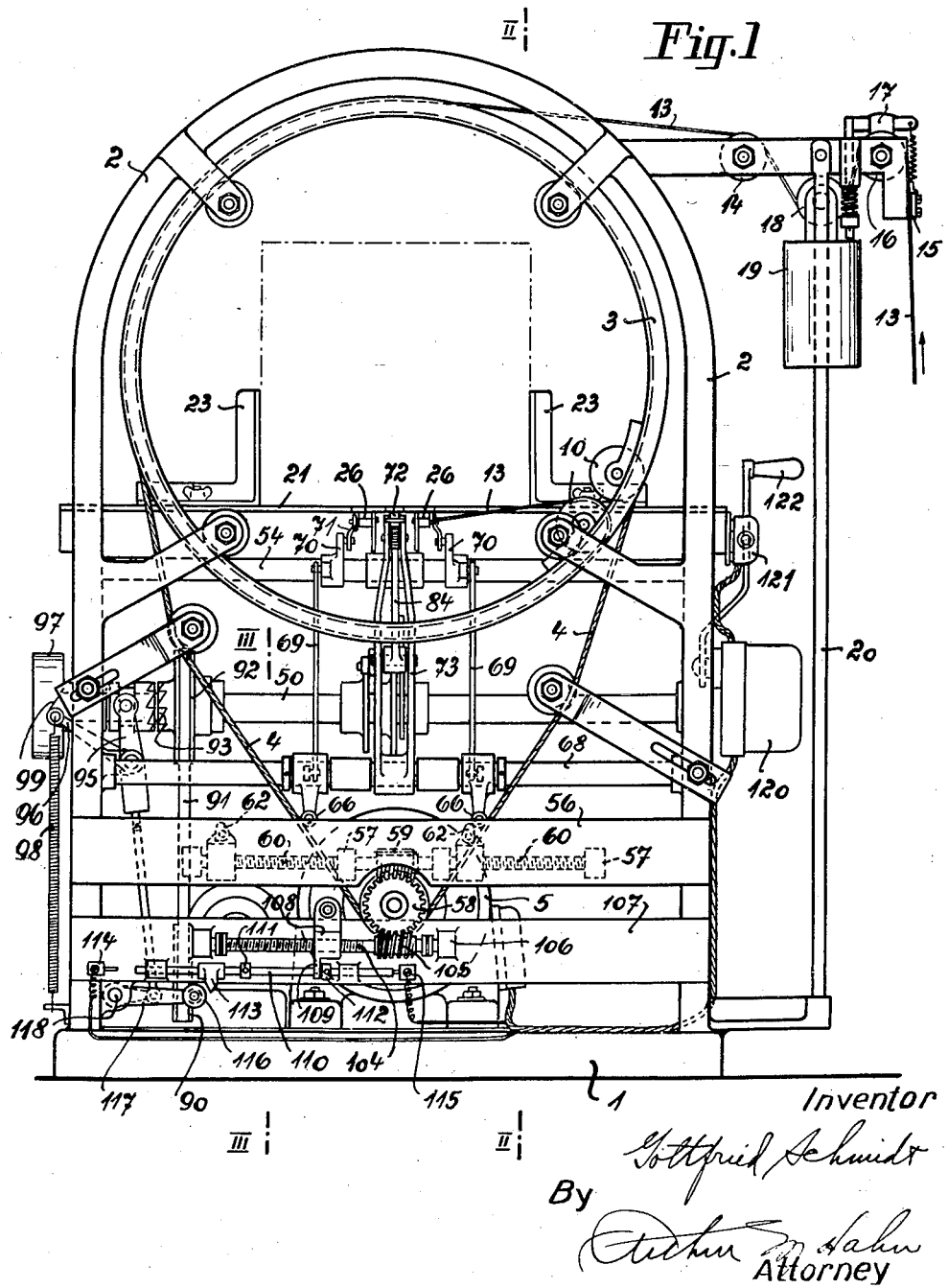
Fig. 1 is a front elevation of the machine.

Fig. 4 is a rear elevation of a part of the machine with the coupling device for driving the cam-shaft for the tightening lever, Fig. 5 is a side elevation of the tightening- and torsion-device for the tying wire on a larger scale, Fig. 6 is a plan view of the torsion device, Fig. 7 is a front elevation of the cam of the clamps for the tightening levers, Fig. 8 is a plan view on a larger scale of the tightening levers, Fig. 9 is an elevation of the tightening clamps with the front end of the tightening levers carrying them, Fig. 10 is a longitudinal section taken on the line X—X of Fig. 9 and Fig. 11 is a cross-section taken on the line XI—XI of Fig. 10, Figs. 12 and 13 show in side-elevation and in section on the line XIII—XIII of Figure 12 the formation and arrangement of the spur-wheel of the torsion-device, Fig. 14 shows the cutting device in side elevation, Fig. 15 is a longitudinal section through the feeding portion of the winding-ring provided with guiding rollers, and Fig. 16 is a cross-section taken on line XVI—XVI of Fig. 15, Figs. 17 to 24 inclusive are diagrammatic views showing different positions during the rotation in both directions of the winding-ring.

Figs. 25 to 30 inclusive are plan views showing the positions of the tightening levers during one cycle of tying, and Fig. 31 is a section taken on the line XI—XI of Fig. 10 at the beginning of the wire tying.

On a base-plate 1 serving as base for the machine a frame 2 is secured, in the upper part of which the rope-roll 3 is supported rotatably by means of guide-rollers. The driving-rope or cable 4 surrounds the rope-roll 3 as well as the rope drum 6 attached to the shaft of the motor 5 with such a number of turns that the rotation of this roll 3 is secured.

Adjacent to the rope-ring 3 and co-axially with the same there is provided winding-ring 8 provided with a guiding groove 7 for the wire. By means of screws 9 this winding-ring 8 is secured to the rope-roll 3. At a place on the circumference of the winding-ring an aperture is arranged in the bottom of the guiding groove 7 and the winding-ring is provided with two guide-rollers 10 having also guide-grooves 11 for the wire, as may be seen from Figs. 15 and 16. The guide rollers are carried rotatably by their supports 12.

The tying wire 13 has preferably an oval cross-section and is fed to the winding-ring 8 from the guide-roller 14. The wire coming from a spool or coil passes first through a guide 15, from which it runs over the roller 16 contacted by a brake-block 17 to the guide-roller 14. Between the two rollers 14 and 16 the wire is tensioned by a weight 19 which is suspended from the tying wire by means of the roller 18 and is slidably arranged on the support 20.

In the lower part of the annular space surrounded by the winding-ring 8 and in a plane traversing this space at suitable heights a supporting plate 21 is arranged serving as the surface of a table. This supporting plate is carried by the frames 2 and 22 of the machine. On the upper side of the supporting plate 21 adjustable holding irons 23 for the packet or box are provided. On the lower side of the supporting plate the two tightening levers 25 are arranged symmetrically to the vertical axis of the winding-ring on stationary vertical pivots 24. Each of these tightening levers carries a lever-portion 26, Figs. 9 and 10, movable in the longitudinal direction of the tightening lever and each of these lever-portions 26 is secured by means of slots and a pair of bolts 27 to the body of the tightening lever 25. A tension spring 35 is secured with one end to the body of the lever 25 and is locked with its other end into a lug 36 bent off from the lever-portion 26 and holds by its tension this latter in its normal position with respect to the tightening lever 25.

At the free end of the lever-portions 26 a vertical projection 28 is arranged, one face of which forms the counter-bearing for the clamp 29. This clamp consists of a body oscillating excentrically on the pivot 30 and is fluted or serrated at its front surface directed towards the projection 28, so that it is capable of firmly holding the tying wire passing at this point. On this fluted front face of the clamp a turning-pin 31 is arranged in such a position, that the tying wire has sufficient space between the surface of the lever 26 and the projection 28, as may be seen from Figs. 10 and 11. The clamp 29 is swung in its operative position by a tension-spring 33 which is attached to an arm 32 of the clamp. A stop 34 secured to the tightening lever 25 serves for opening the clamp, when the lever-portion 26 is shifted in the forward direction.

On the lever-portion 26 of one of the tightening levers 25 a knife 37, Figs. 9, 10 and 14, is arranged by means of a pivot 38 on the inner side face turned towards the other tightening lever. From Fig. 14 it is to be seen, that the knife with its cutting edge 39 is directed towards the projection 28 which possesses a counter cutting edge 40. By means of a spring 41 the knife 37 is pressed against the stop 42. The movement of the knife into the dotted line position in Fig. 14 is effected by a driving-pin 43, the arrangement of which will be described.

The two tightening levers 25 are drawn by a tension spring 44 against the stops 45 secured to the supporting plate 21. Their oscillating movement effecting the tightening of the tying wire is obtained by a pair of pressing rollers 47 attached to a pressing bar 46 which is guided in a bearing block secured to the supporting plate 21. In the path of the pressing rollers 47 the tightening levers 25 carry wedge-shaped cams 48, by the aid of which the levers are swung outwardly.

The longitudinal movement of the pressing bar 46 is effected by means of a cam 51, Fig. 5, arranged on the main controlling or cam shaft 50 and moving a lever 53 carrying a cam-follower 52. This lever 53 is pivotally arranged on a supporting shaft 54 and has a counter arm 55 acting upon the end of the pressing bar 46. By means of the nut 49 on the bar 46 the length of movement of the pressing rollers 47 on the cams 48 may be varied and thereby the degree of the tightening of the tying wire controlled.

The opening movement of the clamps 29 arranged on the ends of the tightening lever portions 26 is effected, as already explained, by a relative movement of the lever portion 26 with respect to the tightening lever 25. The means serving for obtaining this movement consists of a controlling spindle 60, Fig. 1, which is driven from the motor 5 by means of a gear 58 and worm gear 59. The controlling spindle 60 is secured to the frame 2 of the machine by means of a bar 56 carrying the bearings for the spindle 60 and is provided on both sides of its worm 59 with a thread of the same pitch upon each of which a nut 61, Fig. 5, is arranged. This nut 61 rests with a lateral side face upon the bar 56 and is thereby secured against rotation. At its upper face the nut 61 carries a cam 62 the form of which is shown in Fig. 7. This cam is secured to a rotatable shaft having an arm 63 to which a spring 64, Fig. 5, is connected holding the cam in the upright position determined by a supporting projection 65 arranged on the cam. Owing to this formation the cam in one direction is unyielding, but is movable in the opposite direction.

Each of the two cams 62, Fig. 1, acts during its travel upon a roller 66, Fig. 5, each of which is carried by the one shank of a bell-crank lever 67 rotatably mounted on the supporting shaft 68. The bell-crank levers 67 are connected by a draw rod 69 with a second bell-crank lever 70 arranged on the supporting shaft 54. From the second shank of the lever 70 a connecting rod 71 leads to the lug 36, Fig. 8, provided on the lever to which the end of the rod is secured by means of a bolt. A spring 69a, Fig. 2, keeps the bell-crank levers in their starting position. If, however, the roller 66 is out of contact of the travelling cam 62, the lever portion 26 of one of the two tightening levers will be moved forward to such an extent that the clamping slot limited by the projection 28 on the one side and by the front face of the clamping body on the other side lies in the winding plane of the tying wire.

The twisting spur-wheel 72 serving for twisting the two ends of a wire tying overlapping themselves is arranged at the upper end of a swing-lever 73, Fig. 5, journaled on the supporting shaft 68 and is provided with a slot 74, Figs. 12 and 13, which is enlarged into a hollow space 75 in the body of the spur-wheel. The slot 74 of the spur-wheel 72 is continued by the introducing slots 76 which are provided in the swing-levers 73. By means of a connecting bolt 77 on the swing-levers 73 a draw-rod 78, Figs. 5 and 6, is articulated, the forked end of which fits onto the main controlling shaft 50 and carries a cam-roller 79. The cam 80 co-operating with this roller is secured to the shaft 50.

Another cam 81, Figs. 5 and 6, also fixed to the shaft 50 effects, by means of the draw-rod 83 carrying also a cam-roller 82, the oscillation of a toothed sector 84 journaled in the swing-levers 73.

The teeth of this sector 74 engage with the intermediate gear-wheel 86 which on the other hand is in engagement with the teeth of the twisting spur-wheel 72. If the sector is swung forwardly by the action of the cam 81, the intermediate wheel 86 rolls over the teeth 85 and rotates the twisting spur-wheel for example three times. The swing-lever 73 as well as the sector 84 will be maintained in the starting position, Fig. 2, or be brought back to this position after their operation by means of the spring 87 or 88.

On both sides of the sector 84 an adjustable driving-pin 43 is secured in a suitable manner which at the end of the twisting movement of the twisting spur-wheels 72 pushes against the knife 37 in the manner shown in Fig. 14 and effects the movement of the same necessary for cutting off the ends of the wire.

The main-controlling shaft 50 is driven by a second motor 89, Fig. 3, for example, arranged on the base-plate 1 which by means of an intermediate gear sets the belt-pulley 90 in continuous rotation. The latter drives by means of a belt 91 or the like the loose pulley 92 mounted on the controlling shaft 50 and carrying coupling-jaws 93, Figs. 1 and 4, on the side adjacent to a coupling-sleeve 94. The coupling-sleeve 94 is shiftably but non-rotatably connected with the shaft 50 and is acted upon by a coupling-fork 95 provided with an arm 96 which by the action of a spring 98 is in engagement with the side face of a cam-disc 97, the latter being securely fastened on the shaft 50. The cam disc 97 has a depression 99 and the back side of this depression is inclined so steeply, that the engaging arm 96 exerts a certain locking action. In the rest-position of these parts, as in Fig. 4, a bolt 100, which is shiftably arranged in a guide provided in the bearing arm 101 and projecting in the path of a nose 103 of the forked shaft 102 pushes, when the coupling fork and the arm for setting 96 are moved in that direction necessary for setting, against this nose and stops its movement. The bolt 100 may be moved back by means of a controlling device.

This controlling device consists essentially of a screw-spindle 104, Fig. 1, which may be rotated by the gear 53 arranged on the shaft of the driving motor 5 and the worm-wheel 105. The screw-spindle 104 is journaled on a supporting bar 107 by means of the bearings 106. This bar 107 carries, guided by the thread of the spindles, a cam-slide 108 which engages a sliding bar 110 by means of a finger 109. On this sliding bar stops 111 and 112 as well as a cam 113 are adjustably secured. Furthermore switching contacts 114 and 115 are arranged in the path of the ends of the sliding bar 110.

Upon the reciprocating motion of the slide 108 the finger 109 pushes at times against one of the stops 111 or 112 and shifts the sliding bar 110. Hereby the roller 116 of the lever-arm 117 is rotated around its axis 118. By this movement the drawrod 119, Fig. 3, is drawn downward and by the drawing back of the bolt 100 the coupling-fork is released. As the loose pulley 92 also in the released position tends to rotate the shaft 50 with a certain friction, the curved disc at the release of the coupling-fork 95 operates the setting arm 96. In this manner the coupling jaws are brought into engagement with each other and the controlling shaft 50 put in rotation.

In the meantime the bolt 100 has returned into its locking position. If after one revolution of the curved disc 97 the lever 96 enters, by the force of the spring 98, the depression 99, the nose 103 returns into its locking position, thereby pressing the bolt aside for a short time. In this locking position the coupling is released and the main-controlling shaft 50 is retained in this angular position.

The starting of the machine is effected after the insertion of a packet, f. i. of a chest (indicated by dotted lines in Fig. 1) by actuating the hand-operated switch 122, by which an electric contact 121 is closed. Contact 121 controls reversing switch 120, which reverses the motor upon each stopping and starting thereof.

The operation of a machine constructed according to the invention will now be described in connection with Figs. 17-24 and 25-31.

Fig. 17 as well as Fig. 21 shows the starting position for a winding and tying operation. The wire 13 is placed, in the first case, with its end in the clamp 29 on the right side in clamped position. If now the driving motor 5 is switched on by hand, it rotates winding-ring 8 in the clockwise direction. The wire 13 fed by the winding-ring over the guide-rollers 10 will, during this rotation, be bent back around the turning pin 31, Fig. 31, and, as shown by Figs. 18 and 26, placed over the second tightening lever-portion 26. By the continued rotation of the ring 8, the tying wire 13 is wrapped around the whole packet (Fig. 19).

During the last part of the rotation of the winding-ring the cam 62 on the left side (Fig. 1) contacts the roller 66 and effects in this manner a displacement of the lever-portion 26 of the left tightening-lever into the position shown in Fig. 27. The striking of the arm 32 against the pin 34 during this displacement not only opens the clamp but also brings the clamping slot into the winding plane of the tying wire, so that the same, as shown in Fig. 27, may enter the space between the clamp and the counter-bearing. Hereafter the end of the lever 29 returns to the position of Fig. 28, in which the end of the wire is held fast.

The winding-ring completes its rotation approximately in the position shown by Fig. 20, and the rotation of the driving motor 5 has completed the rotation of the controlling-spindle 60 as well as the screw-spindle 104, so that on the latter the cam-slide 108 pushes against the stop 111 and moves the bar 110 in its other end position. Hereby on the one side the coupling-fork 95 is released in consequence of the swinging of the lever arm 117 by the cam 113, and on the other side the switch 120 operated by the contact 114 is opened, so that the motor 5 is switched out and comes to rest.

The releasing of the coupling-fork 95 in the described manner results in the coupling 93 being thrown into gear and the main-controlling shaft 50 makes one revolution. Of the cams arranged on the latter shaft the cam-disc 51 causes, by means of the double-lever 53, 55 and of the pressing bar 46 carrying the pressing rollers 47 the outward swinging of the tightening-levers 25 into the position of Fig. 28 whereby the wire is pulled taut.

Thereafter the swing-levers 73 carrying the twisting spurwheel 72 will be swung forward into the winding plane of the wire by means of the cam-disc 80, whereby the adjacent ends of the wire enter the slot 74, 75. Now the cam-disc 81 effects a movement of the sector 84, so that the twisting spur-wheel 72 will be rotated and the ends of the wire twisted, as may be seen from Fig. 29. At the end of the twisting operation the knives 37 will be actuated by the driving-pin 43, so that the knives will cut off the wire on both sides of the twisted portion (Fig. 30). Now the stationary twisting spur-wheel with its slot lying freely in the direction of movement returns by the backward movement of the swing-levers 73 to its initial position, in which also the sector 84 will return to its initial position. Finally also the tightening levers 25 will be brought back into the initial position (Fig. 25). Hereupon the main-controlling shaft comes to rest, the machine makes no further movements and the packet with the finished bound wire may be taken off.

At the next working operation the winding-ring 8 rotates in the opposite direction as above described and shown in Figs. 21-24. The working operation of the machine takes hereby a corresponding course.

In order that this change shall take place alternatively at the shifting of the ends of the tightening-levers 26, the controlling part in question, that is the controlling spindle 60, is symmetrically formed. The cams moved by the same effect only in the one direction of movement the swinging-out of the rollers 66, so that, as the cam-supports 61 are directed in opposite directions, each cam may present a free path in one of the two directions of movement.

The machine described in the foregoing shall be considered only an example of the invention. The formation of the parts described and shown may be altered within the scope of the appended claims.

What I claim is:

1. A machine for automatically winding, tightening and twisting wire around packages, boxes and the like, comprising a frame, a winding ring for the wire, a supporting plate for the package fixed on the frame, means for rotating the winding ring in one direction for a complete winding operation and in the opposite direction for the following complete winding operation, a pair of clamps mounted in the frame and under the supporting plate for securely holding the two ends of a wire wound around the package by the winding ring, means for automatically opening and closing the said clamps to grip and release the wire, mean supported under the table for moving the clamps away from each other to tighten the wound wire around the package, and means for twisting the ends of the wound and tightened wire to secure the wire around the package.

2. A machine for automatically winding, tightening and twisting wire around packages, boxes and the like, comprising a frame, a winding ring for the wire, a supporting plate for the package fixed on the frame, a reversible motor for rotating the winding ring in one direction for a complete winding operation and in the opposite direction for the following complete winding operation, means under the plate and in the frame for securely holding the two ends of a wire wound around the package by the ring, means for tightening the wound wire around the package, and means for twisting the ends of the wound and tightened wire to secure the wire around the package.

3. A machine for automatically winding, tightening and twisting wire around boxes, packages and the like, comprising a frame, a winding ring for the wire, a supporting plate for the box fixed on the frame, means for rotating the winding ring in one direction for a complete winding operation of the wire around the box and in the opposite direction for the following complete winding operation, a pair of clamps for securely holding the two ends of a wire wound around the box by the ring, means for automatically opening and closing the said clamps to grip or release the wound wire, a spur wheel for twisting the overlapping ends of the wound wire, a bearing device for the spur wheel arranged parallel to the supporting plate and movable transversely to the plane of the winding ring, means for positively moving said bearing device together with the spur wheel transversely to the twisting plane into the twisting position, and means for tightening the wound wire with the aid of the clamps before the ends of the wire are twisted together.

4. A machine for automatically winding, tightening and twisting wire around boxes, packages and the like, comprising a frame, a winding ring for the wire, a supporting plate for the box fixed on the frame, means for rotating the winding ring in one direction for a complete winding operation and in the opposite direction for the following complete winding operation, a pair of clamps for holding the two ends of a wire wound around the box by the ring, means for automatically opening and closing the said clamps, a spur wheel for twisting the overlapping ends of the wound wire, a bearing device for the spur wheel arranged parallel to the supporting plate and movable transversely to the plane of the winding ring, means for positively moving the bearing device together with the twisting spur wheel transversely to the twisting plane into and out of the twisting position, and means for moving the two clamps toward and away from each other for tightening the wound wire around the box before the ends of the wire are twisted together.

5. A machine for automatically winding and clamping wire around boxes, packages and the like, comprising a frame, a winding ring, a supporting plate for the box fixed on the frame, a reversible motor for rotating the winding ring in one direction for a complete winding operation and in the opposite direction for the following complete winding operation, a pair of clamps for holding the two ends of a wire wound around the box by the ring, and means for automatically opening and closing the said clamps.

6. A machine for automatically winding wire around boxes, packages and the like, and for clamping the wire, comprising a frame, a winding ring for the wire, a supporting plate for the box fixed on the frame, a reversible motor for rotating the winding ring in one direction for a complete operation and in the opposite direction for the following complete winding operation, a pair of clamps mounted in the frame and under the plate for holding the two ends of a wire wound around the box by the ring, and means for automatically opening and closing said clamps to grip and release the wound wire.

7. A machine for automatically winding, tightening and twisting wire around boxes, packages and the like, comprising a frame, a ring for winding the wire around the box, a supporting plate for the box fixed on the frame, a reversible motor for rotating the winding ring in one direction for a complete operation and in the opposite direction for the following winding operation, a pair of clamps for holding the two ends of the wound wire, means for automatically opening and closing the said clamps to grip and release the ends of the wound wire and for moving the clamps away from each other in the direction of the overlapping ends of the wire, and twisting means for the ends of the wound wire.

8. A machine for automatically winding, tightening and twisting wire around articles, comprising means for winding a wire around the article in one direction, means for tightening the wound wire around the article by pulling on the overlapping ends of the wire in opposite directions, and means for twisting the overlapping ends of the wire while under tension to secure the latter on the article, said winding means reversing the winding direction of the wire at each new winding operation.

9. A machine for automatically winding, tightening and clamping wire around packages, boxes and the like, comprising a winding ring for the wire, a reversible motor for rotating the winding ring in one direction for a complete winding operation and in the opposite direction for the following complete winding operation, and a pair of clamps for securely holding the two ends of a wire wound around the package by the winding ring.

10. A machine for automatically winding, tightening and twisting wire around packages, boxes and the like, comprising a winding ring for the wire, a reversible motor for rotating the winding ring in one direction for a complete winding operation and in the opposite direction for the following complete winding operation, a pair of clamps for securely holding the two ends of a wire wound around the package by the winding ring, means to move said clamps to tighten the wire, and means for twisting the ends of the wound and tightened wire to secure the wire around the package.

11. A machine for automatically winding, tightening and twisting wire around packages, boxes and the like, comprising a frame, a winding ring for the wire, a supporting plate for the package fixed on the frame, a reversible motor for rotating the winding ring in one direction for a complete winding operation and in the opposite direction for the following complete winding operation, a pair of clamps mounted in the frame and under the supporting plate for securely holding the two ends of a wire wound around the package by the winding ring, means for automatically opening and closing the said clamps to grip and release the wire, means supported under the table for moving the clamps away from each other to tighten the wound wire around the package, and means for twisting the ends of the wound and tightened wire to secure the wire around the package.

12. A wire applying machine comprising a winding ring for the wire, a reversible motor for rotating the winding ring in one direction for a complete winding operation and in the opposite direction for the following complete winding operation, and means for holding the ends of a wound wire.

13. A wire applying machine comprising a winding ring for the wire, a reversible motor for rotating the winding ring in one direction for a complete winding operation and in the opposite direction for the following complete winding operation, means for holding the ends of a wound wire, and means for tightening the wire as it is held by the holding means.

14. A wire applying machine comprising a winding ring for the wire, a reversible motor for rotating the winding ring in one direction for a complete winding operation and in the opposite direction for the following complete winding operation, means for holding the ends of a wound wire, means for tightening the wire as it is held by the holding means, and means for twisting the wire after it is tightened by the tightening means.

15. A machine for automatically winding, tightening and twisting wire around boxes, packages and the like, comprising a frame, a winding ring for the wire, a supporting plate for the box fixed on the frame, a reversible motor for rotating the winding ring in one direction for a complete winding operation and in the opposite direction for the following complete winding operation, a pair of clamps for holding the two ends of a wire wound around the box by the ring, means for automatically opening and closing the said clamps, a spur wheel for twisting the overlapping ends of the wound wire, a bearing device for the spur wheel arranged parallel to the supporting plate and movable transversely to the plane of the winding ring, means for positively moving the bearing device together with the twisting spur wheel transversely to the twisting plane into and out of the twisting position, and means for moving the two clamps toward and away from each other for tightening the wound wire around the box before the ends of the wire are twisted together.

16. A machine for automatically winding and tightening wire around boxes, packages and the like, comprising, a frame, a ring for winding the wire around the box, a supporting plate for the box fixed on the frame, means for rotating the winding ring in one direction for a complete winding operation of the wire and in the opposite direction for the following complete winding operation, a pair of clamps for holding the two ends of the wire wound by the ring, means for automatically opening and closing the said clamps to grip and release the ends of the wound wire, including a main cam shaft operative when driven in one direction to release one of said clamps and operative when driven in the other direction to release the other of said clamps and means for transmitting the action of the cams to the clamps whereby the clamps will hold the ends of the wire, a driving motor means mounted in said frame to actuate said means for rotating the winding ring and said means for opening and closing said clamps, and means for moving said two clamps away from each other to tighten the wound wire.

17. A wire applying machine comprising a frame including a substantially horizontal member for supporting boxes or the like upon which the boxes or the like are placed, horizontally movable clamps mounted upon said frame to engage the opposite sides of the boxes or the like thereby to hold the boxes or the like while wire is being applied, a winding ring for the wire rotatably supported on said frame and adapted upon rotation to wind the wire about a box positioned between said clamps, motive means connected to rotate said winding ring selectively in either direction, and cyclic control means to control the operation of the machine thereby to rotate said winding ring in one direction for one winding operation and to rotate the winding ring in the opposite direction for the next winding operation, said cyclic control means including a switch which is operated to initiate each individual winding operation and reversing means which is effective as a result of the rotating of the ring in one direction to initiate the driving of the ring in the other direction during the next winding operation.

GOTTFRIED SCHMIDT.